United States Patent
Hutchins

(10) Patent No.: US 11,017,179 B2
(45) Date of Patent: May 25, 2021

(54) REAL-TIME IN-CONTEXT SMART SUMMARIZER

(71) Applicant: OPEN TEXT SA ULC, Halifax (CA)

(72) Inventor: Gareth Edward Hutchins, Farnham (GB)

(73) Assignee: OPEN TEXT SA ULC, Halifax (CA)

( * ) Notice: Subject to any disclaimer, the term of this patent is extended or adjusted under 35 U.S.C. 154(b) by 123 days.

(21) Appl. No.: 16/235,031

(22) Filed: Dec. 28, 2018

(65) Prior Publication Data

US 2020/0210521 A1    Jul. 2, 2020

(51) Int. Cl.
| | |
|---|---|
| G06F 16/34 | (2019.01) |
| G06F 16/958 | (2019.01) |
| G06F 40/35 | (2020.01) |
| G06N 20/00 | (2019.01) |
| G06F 16/957 | (2019.01) |
| G06F 40/221 | (2020.01) |
| G06F 3/0484 | (2013.01) |

(52) U.S. Cl.
CPC .......... *G06F 40/35* (2020.01); *G06F 16/9577* (2019.01); *G06F 16/986* (2019.01); *G06F 40/221* (2020.01); *G06N 20/00* (2019.01); *G06F 3/04847* (2013.01)

(58) Field of Classification Search
CPC .. G06F 16/3344; G06F 16/345; G06F 40/289; G06F 40/30; G06F 40/205
See application file for complete search history.

(56) References Cited

U.S. PATENT DOCUMENTS

| | | | |
|---|---|---|---|
| 8,135,699 B2* | 3/2012 | Gupta | G06F 16/345 707/708 |
| 8,700,480 B1* | 4/2014 | Fox | G06Q 30/0278 705/26.1 |

(Continued)

FOREIGN PATENT DOCUMENTS

WO    WO2018/002839    1/2018

OTHER PUBLICATIONS

Article Summarizer Online [retrieved from <<https://summarizing.biz/best-summarizing-stratregies/articles-summarizer-online/>> on May 17, 2019], 6 pages.

(Continued)

*Primary Examiner* — Scott T Baderman
*Assistant Examiner* — Mario M Velez-Lopez
(74) *Attorney, Agent, or Firm* — Sprinkle IP Law Group

(57) ABSTRACT

A summarizer can be invoked by a user to summarize content. Once started, the summarizer can examine the content, determine a main body of the content, extract texts from the main body, concatenate the texts into a text block, and make a call to an artificial intelligence (AI) platform. The call can contain the text block and specify a user-configurable summarization range for summarizing the text block. The AI platform is operable to generate a sentiment of the text block and a summary of the text block in the summarization range and return them to the summarizer. The summarizer, in turn, can instruct an application on the user device to generate a window or page for displaying the sentiment and the summary in the summarization range on the user device, in real time and in context of the content that the user is viewing, reading, or listening.

20 Claims, 5 Drawing Sheets

(56) References Cited

U.S. PATENT DOCUMENTS

| | | | |
|---|---|---|---|
| 10,409,898 B2* | 9/2019 | Sharma | G06F 16/345 |
| 10,685,050 B2* | 6/2020 | Krishna | G06N 20/00 |
| 10,831,834 B2* | 11/2020 | Zheng | G06F 16/3347 |
| 10,891,427 B2* | 1/2021 | Chawla | G06N 20/00 |
| 2004/0141016 A1* | 7/2004 | Fukatsu | G06F 16/954 |
| | | | 715/856 |
| 2012/0041937 A1* | 2/2012 | Dhillon | G06F 16/36 |
| | | | 707/708 |
| 2017/0277668 A1* | 9/2017 | Luo | G06F 16/345 |
| 2018/0150905 A1* | 5/2018 | Lee | G06F 40/30 |
| 2018/0157628 A1* | 6/2018 | Hollingsworth | G06F 40/151 |
| 2020/0320116 A1* | 10/2020 | Wu | G06F 16/438 |

OTHER PUBLICATIONS

International Search Report and Written Opinion issued for PCT Application No. PCT/IB2019/061143, dated Feb. 28, 2020, 8 pages.

* cited by examiner

REAL-TIME IN-CONTEXT SMART SUMMARIZER

TECHNICAL FIELD

This disclosure relates generally to the field of data processing. More particularly, this disclosure relates to systems, methods, and computer program products for a smart summarizer, useful for real-time in-context data processing.

BACKGROUND OF THE RELATED ART

With today's around-the-clock news cycle and the proliferation of blogs, web sites, social media applications, etc. on the Internet, even a proficient reader can find it difficult to effectively and efficiently consume and digest the massive amount of information that comes across the reader's screen. Particularly when there is a time constraint, a reader may try to skim an article or skip it altogether.

Unfortunately, currently, there is not a specific tool available on the market that can help a reader to quickly understand the major points of a document. For example, if a user wishes to summarize an article posted in a blog, web site, or social media application, the best the user can do is to get the article by copying the article from the blog, web page, or social media post. To make such a copy, the user would use a pointing device such as a keyboard or a mouse to first highlight the texts of the article displayed on the reader's screen. The user would then need to select the highlighted texts using, for instance, the copy function of the browser within which the web page is displayed (e.g., by directly the pointing device to the copy function or using a combination of keys on the keyboard). The copy function would then place the copied texts in a "clipboard" in the computer memory of the user's device. Separately, the user would need to start a text editing program, such as an electronic notepad or text editor, and create a new document. This new document when created is initially empty. The user would then and use the text editing program's "paste" function to move the copied texts from the "clipboard" in memory into the newly created document. The user would then start a web-based summarization engine (e.g., by directing the browser to another web where a summarization engine is run). The user would upload the document containing the copied texts into the web-based summarization engine which, in turn, then outputs a summarization of the copied texts.

The above-described steps are done neither in real time nor in context of the original article. That is, the user has to leave the blog, web site, or social media application where the original article is posted, start a text editing program, create another document, start a web-based summarization engine, and provide the user-created document to the web-based summarization engine. The summarization thus generated by the web-based summarization engine is not displayed along with the original article.

SUMMARY OF THE DISCLOSURE

An object of the invention is to leverage artificial intelligence to summarize content in real time and in context of the content. In some embodiments, this object can be realized in a summarizer.

In some embodiments, the summarizer is operable to run on a user device and can receive an indication or an instruction from a user to summarize content displayed on the user device. In some embodiments, the user device can comprise a mobile device, a smart phone, a laptop computer, or a desktop computer.

In response, the summarizer can examine the content displayed on the user device, determine a main body of the content, extract texts from the main body of the content, concatenate the texts from the main body of the content into a text block, and make a call to an artificial intelligence (AI) platform. The call made by the summarizer can include the text block and specify a user-configurable summarization range for summarizing the text block.

In response to the call, the AI platform can process the text block, generate a sentiment and a summary of the text block, and return the sentiment and the summary in the summarization range to the summarizer on the user device. In turn, the summarizer can instruct an application such as a browser application on the user device to generate a window or page for displaying the sentiment and the summary in the summarization range on the user device in real time and in context of the content displayed on the user device. The use-configurable summarization range can comprise a number, category, percentage, or size of sentence.

In some embodiments, the content comprises a web page and the main body comprises an article within the web page. In such cases, the summarizer can run in an environment provided by the browser application on the user device or the summarizer can be implemented as an extension of the browser application on the user device.

In some embodiments, to determine the main body from the web page, the summarizer can examine a source code of the web page and identify text nodes in the source code corresponding to the main body. In some embodiments, in identifying the text nodes in the source code, the summarizer is operable to identify HyperText Markup Language (HTML) tags, the HTML tags including at least a <p> tag, a <plaintext> tag, or a <div> tag. The summarizer can then parse the text nodes and extract the texts from the text nodes.

In some embodiments, the window or page generated by the browser application can comprise a popup. The popup can be an HTML page that overlays a portion of the web page on which the article is displayed. The sentiment and the summary can be displayed in the popup on the user device in real time in context of the article within the web page.

Other implementations are also possible. For instance, the summarizer can be implemented as on the user device as an agent of the AI platform and can operate independently of the browser application or any application through which the user is viewing the content on the user device. In some embodiments, the content comprises a document having a portable document format extension (.pdf) or a document extension (.doc). Further, the sentiment and/or the summary can be stored on the user device or forwarded to another device over a network.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
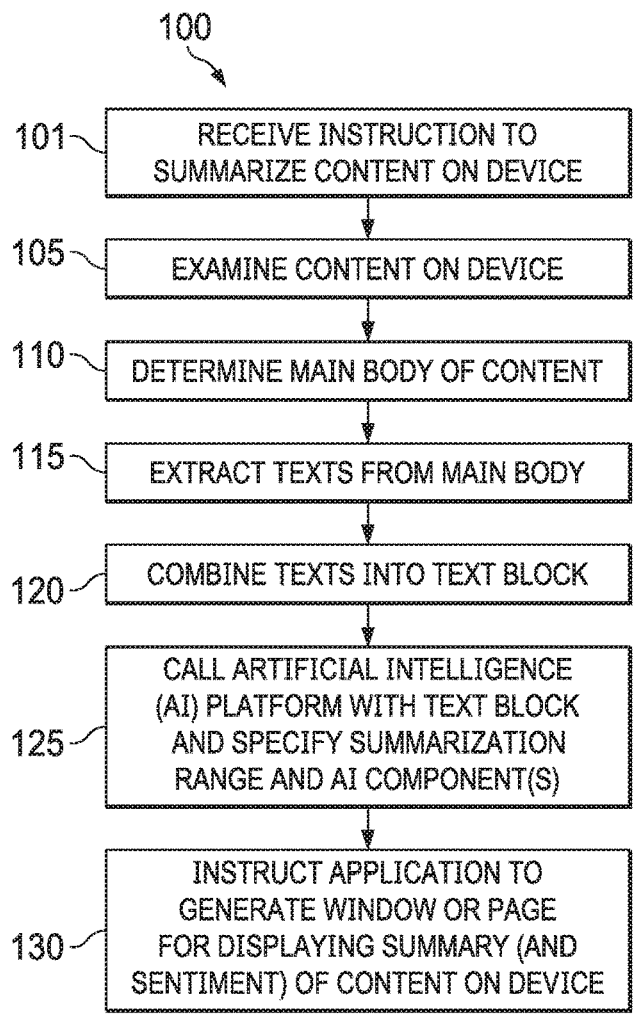
FIG. 1 depicts a flow chart illustrating an example of a method for real time in context summarization according to some embodiments.

FIG. 1 depicts a flow chart illustrating an example of method 100 for real time in context summarization. In some embodiments, a summarizer on a user device may receive an indication or instruction from a user to summarize content displayed on the user device (101). In response, the summarizer is operable to examine the content displayed on the user device (105). This examination can vary from implementation to implementation, depending upon the type of content. A goal here is to identify what is relevant text that would be useful for summarization and distinguish such relevant text from irrelevant content. From this examination, the summarizer is operable to determine a main body of the content (110). Once the main body is determined, the summarizer is operable to extract texts from the main body of the content (115). The extracted texts can then be concatenated or otherwise combined into a text block (120). The summarizer is operable to pass this text block to the AI platform. In some embodiments, this can be accomplished by making a call (e.g., a web service call) to the AI platform, for instance, through an application programming interface (API) of the AI platform (125). The call can contain the necessary information for the AI platform to process the text block. For example, the call can contain the text block and a summarization range for summarizing the text block. The summarization range is configurable by the user and can be presented by the summarizer as a number of words, characters, or paragraphs (e.g., 25 words, 50 words, 100 words, 150 words, 500 characters, 1200 characters, 1 paragraph, 2 paragraphs, etc.), a category (e.g., foreign affair, diplomacy, politics, etc.), a percentage of the input (e.g., 50%, 25%, 10%, etc.), or a sentence size (e.g., one sentence, two sentences, five sentences, eight sentences, 20 sentences, etc.). The AI platform can process the text block, generate a sentiment and a summary of the text block, and return them to the summarizer in response to the call. The summarizer, in turn, can instruct an application (e.g., a browser application within which the content is displayed) to generate a popup to display the sentiment and the summary in the user-configured summarization range in real time in context of the content that the user is viewing on the user device (130).

Figure 2:
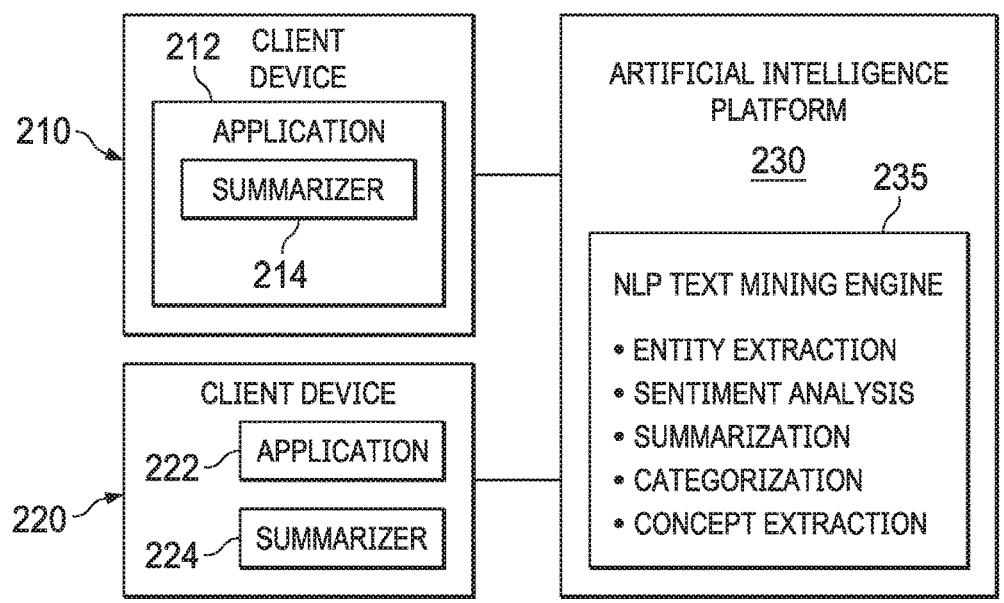
FIG. 2 depicts a diagrammatic representation of an example network computing environment where embodiments of a summarizer disclosed herein can be implemented.

FIG. 2 depicts a diagrammatic representation of an example network computing environment where embodiments of a summarizer disclosed herein can be implemented. In the example of FIG. 2, summarizer 214 runs within an environment provided by application 212 on client device 210. Here, client device 210 is referred to as a "client" of AI platform 230 in the sense that summarizer 214, when invoked, has a client-server relationship with AI platform 230. In some embodiments, application 212 can comprise a browser application. In some embodiments, summarizer 214 can be implemented as an extension of such a browser application.

In such a case, summarizer 214 would receive the instruction from the user through the browser application where the content is displayed in a web page through the browser application. Such a web page usually contains many types of information, in addition to an article of interest to the user. To this end, summarizer 214 does not attempt to capture the entire web page. Rather, as described above, summarizer 214 is operable to examine the web page and determine what is the main body of the web page. In some embodiments, summarizer 214 is operable to obtain a source code of the web page, examiner the source code, and distinguish relevant text from non-relevant information on the web page. In some embodiments, this may entail identifying text nodes in the source code corresponding to the main body, including identifying HTML tags of interest such as the <p> tag, <plaintext> tag, or <div> tag. Using the HTML tags thus identified, summarizer 214 is operable to parse the text nodes and extract the texts from the text nodes. As described above, summarizer 214 is further operable to combine the extracted texts into a text block and call AI platform 230 with the text block.

In the example of FIG. 2, AI platform 230 includes natural language processing (NLP) text mining engine 235. NLP text mining engine 235 is configured for performing a plurality of text mining functions, including entity extraction, sentiment analysis, summarization, categorization, concept extraction, etc.

For entity extraction, NLP text mining engine 235 is operable to extract named entities. For instance, suppose a document describes that a specific company is releasing a new product. Based on linguistic rules and statistical patterns, NLP text mining engine 235 can extract the company's name, the new product name, etc. from the document. All occurrences of an entity type may be extracted. For synonyms, acronyms, and variations thereof, an authority file may be used. An authority file refers to a controlled vocabulary of terms and cross-reference terms that assists entity extraction to return additional relevant items and related metadata (e.g., geopolitical locations, person names, organization names, trademarks, events, etc.). There can be multiple authority files, each for a particular controlled vocabulary of terms and cross-reference terms. Output from entity extraction can be a list of extracted entities with attributes and relevancy ranking. Since text mining is performed at the document level, the extracted metadata (e.g., the company's name and the new product name in this example) can be used to enrich the document. NLP text mining engine 235 can learn how to determine an entity based on previous examples from which a model has been trained using machine learning. For example, suppose multiple documents mention a company name "Company X" following a product name "ABC," NLP text mining engine 235 may learn from these examples and determine to add an entity "Company X" for a new document that mentions the product name "ABC", even if the new document does not explicitly mention the company name "Company X."

For sentiment analysis, NLP text mining engine 235 is operable to programmatically examine a piece of content (e.g., a post, a document, a tweet, an article, a message, etc.) in an even more fine-grained manner. For instance, for a given sentence in a document that describes a company releasing a new product, NLP text mining engine 235 is operable to analyze the sentence and determine whether the sentiment for the totality of the sentence is positive, negative, or neutral. Since NLP text mining engine 235 also extracts the company name and the product name, the sentiment or tonality detected in a sentence by NLP text mining engine 235 can be associated with an entity or entities (e.g., the company and/or the product) in the sentence. At the entity level, multiple instances of a given entity can be combined to assess an overall sentiment value for the entity. In this way, what the document says about the product (e.g., a positive tone, a negative tone, or a neutral tone) at various levels (e.g., at the document level, the sentence level, the entity level, etc.) can be captured and leveraged by a content analysis (along with other documents relevant to the company and the product), for instance, for trend analysis and mood detection. NLP text mining engine 235 can also leverage machine learning to learn how to determine a sentiment, for instance, by running a machine learning algorithm that utilizes input data and statistical models (e.g., NLP models or NLP classifiers) to predict an output value (e.g., a tone value).

For conception extraction, NLP text mining engine 235 is operable to extract key concepts, including complex concepts. For example, concepts can be identified with an algorithm based on linguistic and statistical patterns (e.g., keywords and key phrases). These can include the most relevant noun(s) and phrase(s) for a given purpose. The extracted concepts can be weighted ranked such that they are outputted with relevancy ranking.

For categorization, NLP text mining engine 235 is operable to programmatically examine the input text and determine, according to a controlled vocabulary (a taxonomy—a scheme of classification), a best topic for the document and attach the topic to the document. For instance, a news article discusses that a president is going to visit a country. NLP text mining engine 235 is operable to programmatically examine the article, determine that this article concerns foreign affair and/or diplomacy, and add "foreign affair" and/or "diplomacy" as metadata (e.g., "category=foreign affair" or "topic=diplomacy") to the article, even if the article itself does not literally contain "foreign affair" or "diplomacy." Downstream from text mining, these pieces of metadata can be used by AI platform 230 in different ways for various reasons. For instance, the vocabulary of NLP text mining engine 235 can be enhanced using machine learning techniques. Additionally or alternatively, an immediate change can be made to NLP text mining engine 235 or through a user interface. NLP text mining engine 235 is capable of learning how to categorize new content based on previous examples from which a model has been trained using machine learning (e.g., using taxonomies, training sets, and rules grouped in a categorization knowledge base). There can be multiple categorization knowledge bases. Output from categorization can include a list of extracted categories with relevancy rankings and a confidence score rating for each category.

Generally, summarization refers to the process of shortening a text document in order to create a summary with the major points of the original document. To perform summarization, NLP text mining engine 235 is operable to identify the most relevant sentences in a piece of content using, for instance, an output from the categorization, and generate a summary with the identified sentences. For instance, sentences with the highest relevancy can be identified, extracted, and included in the summary. This is a much more precise way to identify relevant content at the sentence level.

Each of the text mining functions of NLP text mining engine 235 can be implemented as a component of the underlying AI platform 230. For example, the sentiment analysis function can be implemented as a sentiment analysis component of AI platform 230 and the summarization function can be implemented as a summarization component of AI platform 230. OpenTextr™ Magellan, available from Open Text, headquartered in Waterloo, Canada, is an example of a suitable AI platform 230. OpenTextr™ Magellan is a flexible AI and analytics platform that combines machine learning, advanced analytics, data discovery, and enterprise-grade business intelligence with the ability to acquire, merge, manage, and analyze structured and unstructured big data.

The NLP text mining capabilities of AI platform 230 in some cases can be accessible through a text mining service (e.g., by making an API call to an API endpoint—a base universal resource locator (URL)—where an instance of the text mining service is hosted on a server computer of AI platform 230). The text mining service (which can be a type of web services) accepts an eXtensible Markup Language (XML) post that contains the text to be analyzed, as well as what text mining functions to be used. For example, a request to the text mining service of AI platform 230 for the tone and sentiment of a text block may contain the following information:

```
<?xml version="1.0" encoding="UTF-8" ?>
<AIserver>
    <text_block> This is a story about Gareth Hutchines. He lives
in Farnham in Surrey and works for OpenText in Reading. He's
pretty cool. </text_block>
        <Methods>
            <Sentiment/>
        </Methods>
</AIserver>
```

In response to this request, the text mining service can return the sentiment and tone of each sentence in the text as well as the whole piece of text or document, as specified in the Methods section (i.e., the "Sentiment" command) of the request. As a non-limiting example, the text mining service can return the following:

```xml
<?xml version="1.0" encoding="UTF-8" standalone="yes"?>
<AIserver Version="3.0">
<ErrorID Type="Status">0</ErrorID>
<ErrorDescription>Success</ErrorDescription>
<Results>
    <Sentiment>
        <SentenceLevel>
            <Sentence>
                <Text begin="6" end="44">This is a story about Gareth Hutchins.</Text>
                <Subjectivity score="10.0075">fact</Subjectivity>
                <Tone>neutral</Tone>
            </Sentence>
            <Sentence>
                <Text begin="45" end="109">He lives in Farnham in Surrey and works for Opentext in Reading.</Text>
                <Subjectivity score="9.7272">fact</Subjectivity>
                <Tone>neutral</Tone>
            </Sentence>
            <Sentence>
                <Text begin="110" end="127">He's pretty cool.</Text>
                <Subjectivity score="79.87 01">opinion</Subjectivity>
                <PositiveTone score="38.471"/>
                <NegativeTone score="24.893"/>
                <Tone>positive</Tone>
            </Sentence>
        </SentenceLevel>
        <DocumentLevel>
            <Subjectivity score="75.0036" distribution="17.2043">opinion</Subjectivity>
            <PositiveTone score="25.3561" distribution="17.2043"/>
            <NegativeTone score="16.4069" distribution="0.0"/>
            <Tone>positive</Tone>
        </DocumentLevel>
    </Sentiment>
</Results>
```

In some embodiments, the call made by document capture server 220 can include a knowledge base identifier. Using different knowledge bases may result in different types of summarizations. However, this is not a requirement when making a call to AI platform 630. In some embodiments, AI platform 630 can determine, as appropriate to the text contained in the call, which knowledge base (e.g., taxonomy) to use in processing the call.

As a non-limiting example, the International Press Telecommunications Council (IPTC) is the global standards body of the news media. AI platform 630 can include an IPTC taxonomy. Below provides a non-limiting example showing how to utilize the IPTC taxonomy or knowledge base (KB) to summarize a piece of text or text block into one sentence. In this example, a command is added to the Methods section as follows:

```xml
<Methods>
    <summarizer>
        <Sentences>1</Sentences>
        <KBid>IPTC</KBid>
    </summarizer>
</Methods>
```

Below provides an example of a structure that is returned in the Results section:

```xml
<Results>
    <summarizer>
        <Summary>[A Summary of text]</Summary>
    </summarizer>
```

-continued

```xml
</Results>
```

AI platform 230 provides different taxonomies for NLP text mining engine 235. Further, a user can create a taxonomy and direct NLP text mining engine 235 to use the user-created taxonomy to perform the summarization.

Other features of NLP text mining engine 235 can be utilized in a similar way, for instance, by adding respective methods (e.g., entity extraction, concept extraction, categorization, etc.) to the call. In response to a call, AI platform 230 may utilize its components as directed by the call to process the text contained in the call and return the results accordingly.

The results returned by AI platform 630 can be presented in many ways. For example, a popup window or page (referred to herein as a "popup") can be generated to display the sentiment and the summary on client device 210 in real time in context of the article within the web page. In some embodiments, the popup can be a HTML page with elements for the tone, subjectivity, and summarization returned by AI platform 630. In some embodiments, the popup can include a slider, slide container, or any suitable user interface element for specifying a desired summarization range such as a number of words, characters, or paragraphs, a category, a percentage of the input text, or a sentence size (e.g., between one sentence to the entire input text). These elements can then be referenced from the JavaScript for the popup.

Other implementations are also possible. For example, as shown in FIG. 2, summarizer 224 can be implemented to run on client device 220 separately and independently of application 222. In some embodiments, summarizer 224 can be implemented as an agent or client software of AI platform 230.

In some embodiments, application 222 can comprise any suitable computer program that can read, render, and/or display documents (e.g., documents having a portal document format (PDF) extension (.pdf), a document extension (.doc), a text extension (.txt), an HTML extension (.html), etc.) on client device 220. Non-limiting examples of application 222 can include a browser application, on-device virtual assistant program, text-to-speech software, news reader application, and so on. In some embodiments, while a user is interacting with application 222 on client device 220, the user may wish to summarize something on client device 220. Application 222 can have a summarize command (e.g., a voice command, touch button, or the like) through which the user can instruct application 222 to summarize what the user is viewing, reading, and/or listening on client device 220. Responsive to the summarize command, application 222 can invoke or start summarizer 224. In turn, summarizer 224 is operable to examine what the user is viewing, reading, and/or listening on client device 220, obtain a summary from AI platform 230 as described above, and return the summary (with any desired AI-augmented analytics on sentiment, tonality, category, concept, named entity, etc.) to application 222 for presentation on client device 220.

Client devices 210, 220 represent non-limiting examples of user devices where embodiments of a summarizer disclosed herein can be implemented. Example user devices can include, but are not limited to, mobile devices, smart phones, laptop computers, tablet computers, desktop computers, portable computing devices, and so on.

Further, in some embodiments, the sentiment or the summary is not stored on the user device or anywhere. Each time the summarization range is changed, a new call containing the text block and the new summarization range is prepared by the summarizer and sent to the AI platform. In some embodiments, the sentiment and/or the summary can be stored on the user device and/or forwarded to another device over a network (e.g., by email, file transfer, or other types of network communications for further analysis and/or archiving purposes).

Figure 3A:
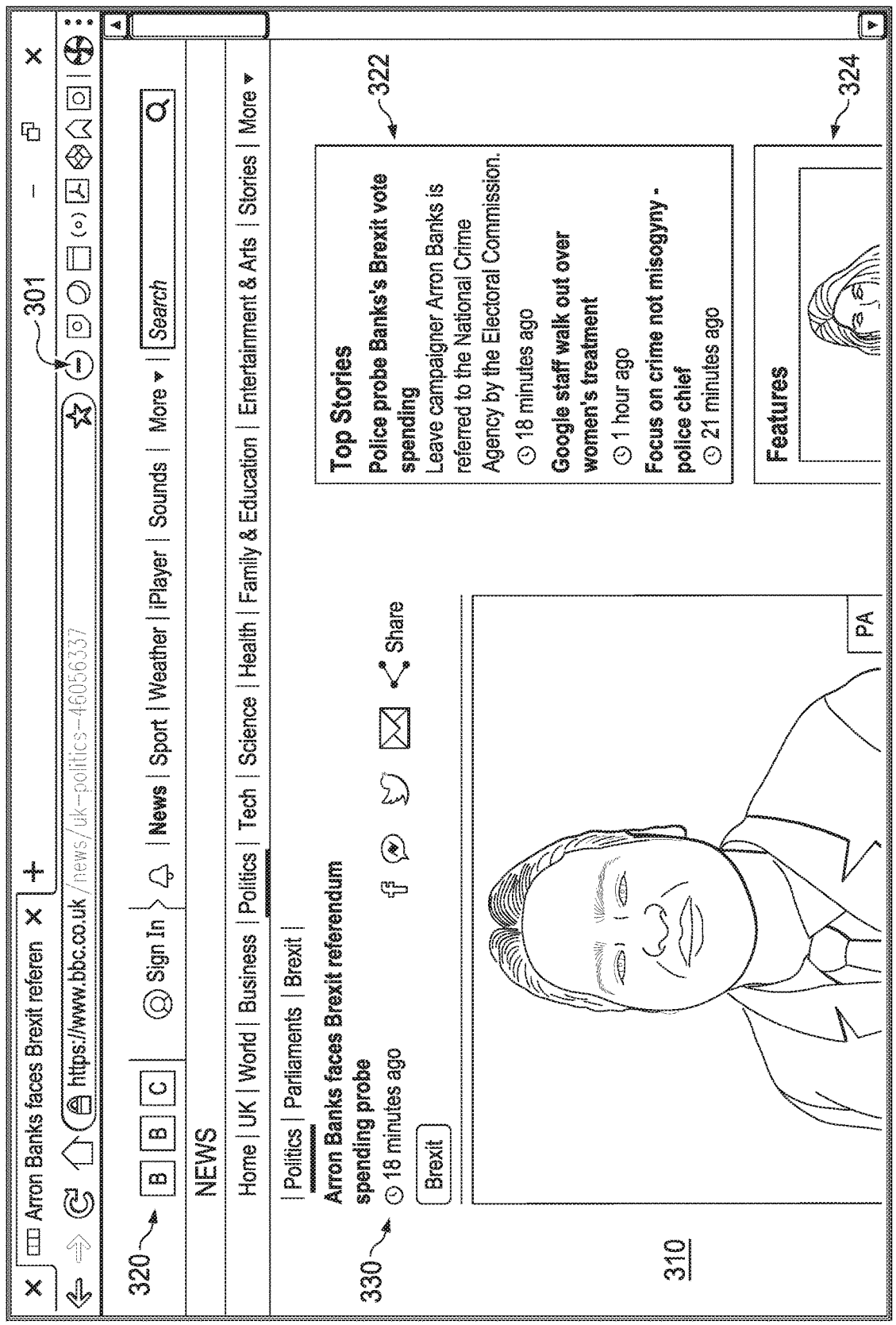
FIGS. 3A-3C depict diagrammatic representations of screenshots showing a summarizer running within a browser application according to some embodiments.
Figure 3B:
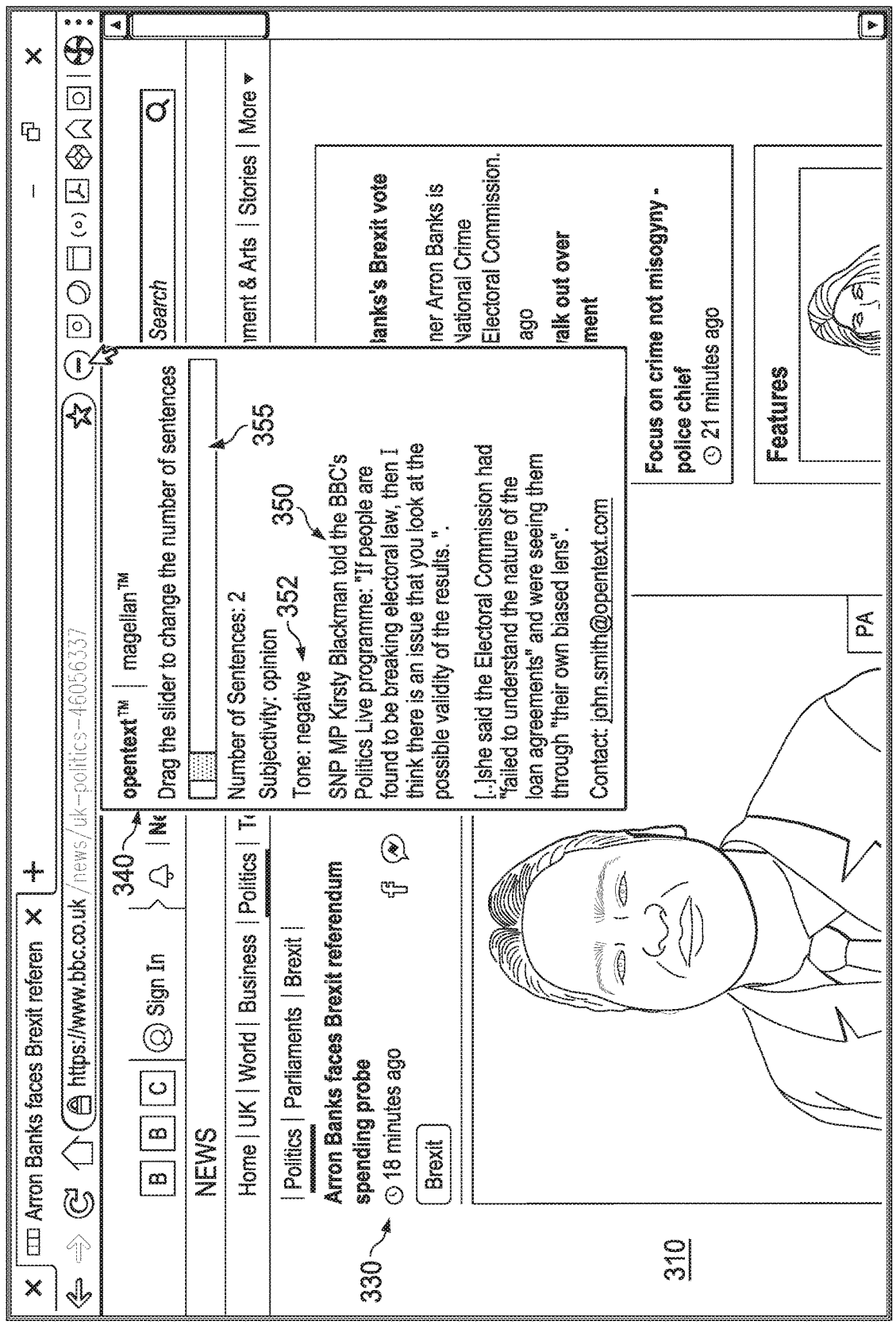
Figure 3C:
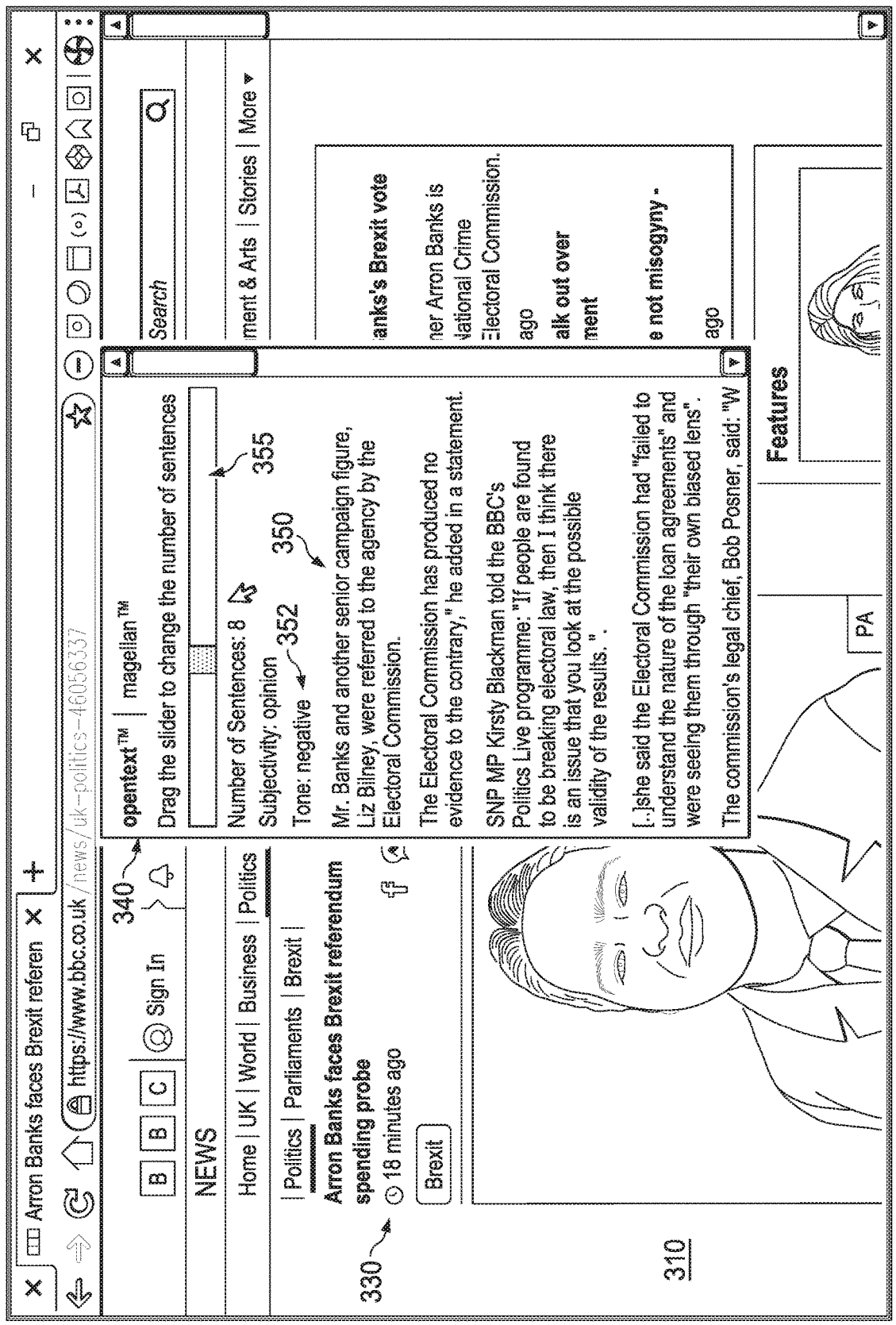

FIGS. 3A-3C depict diagrammatic representations of screenshots showing a summarizer running within a browser application according to some embodiments. In the example of FIG. 3A, a user starts or otherwise invokes summarizer 301 by selecting summarizer 301 from a menu or a list of functions provided by browser application 300 running on the user device. Other ways to start or invoke summarizer 301 are also possible. Thus, the example shown in FIG. 3A is meant to be illustrative and non-limiting.

In this case, the user is viewing web page 310 which contains navigational element or menu 320, article 330, sections 322, 324, etc. What the user sees, however, is not what summarizer 301 has to work on. This is because a web page is a hypertext document that is suitable for browser application 300 to display. The web page itself is written in HTML or a comparable markup language, referred to as "page source" or "source code" for the web page. This source code contains information such as cookies, headers, etc. that is not relevant for the purpose of summarization. Therefore, before article 330 can be summarized, summarizer 301 first has to examine the source code for web page 310 to determine what is actually displayed. This can be done by traversing or looping through all the sections of web page 310 to look for certain HTML tags and remove hidden (e.g., non-displayed) information from the source code, for instance:

```
var divs = document.getElementsByTagName("div");
for (divx of divs) {
    if (divx.style.display === 'none') {
        var divId = divx.id;
        var divR = document.getElementById(divId);
        if (divR !== null) {
            divR.parentNode.removeChild(divR);
        }
    }
}
```

Next, summarizer 301 is operable to loop through what is left and look for any visible "paragraph" elements, each of which is a piece of text that can then be added to a text block. The text block is what summarizer 301 will send to the text mining server (in a call to the AI platform). A non-limiting example is provided below:

```
var allPs = document.getElementsByTagName("p");
var rText = "";
for (val of allPs) {
    if (val.style.display != 'none' || val.hidden != true) {
        rText += val.innerText + '. ';
    }
}
```

In some embodiments, summarizer 301 is operable to remove and/or replace certain characters. While the AI platform can support different languages in addition to English, some characters may not be needed and/or supported. Non-limiting examples of character removal/replacement are provided below:

text=text.replace(/[\n\r]+/g, ' ');
text=text.replace(/&/g,"&");
text=text.replace(/</g,"<");
text=text.replace(/>/g,">");
text=text.replace(/"/g,'"');
text=text.replace(/'/g,"'");
text=text.replace(/\[\d*\]/g, ' ');
text=text.replace(/\.(?=[^\d])[ ]*/g, '.')

In some embodiments, the text mining service of the AI platform can be called by summarizer 301 using JavaScript. The non-limiting example provided below passes the text to the AI platform and then populates the results to a popup.

```
var command = "<?xml version=\"1.0\" encoding=\"UTF-8\"
?><AIserver><Text_Block>";
command = command + text;
//looking for # sentences
command = command +
```

```
"</Text_Block><Methods><summarizer><Sentences>" + ranger.value +
"</Sentences><KBid>IPTC</KBid></summarizer><Sentiment></Sentiment
></Methods>
</AIserver>";
//now do the post
var URL = 'http://[Your TME URL]:[port]/rs/';
//var result = "";
fetch(URL, {
    method: "POST",
    body : command,
    headers : {"Content-Type" : "application/xml"},
})
.then(function(res) {
    if (res.ok) { // ok if status is 2xx
        console.log('OK ' + res.statusText);
    } else {
        console.log('Request failed. Returned status of ' +
res.status);
    }
    return res.text( )
})
.then(function(text) {
    parser = new DOMParser( );
var xmlDoc = parser.parseFromString(text,"text/xml");
result = xmlDoc.getElementsByTagName("Summary")[0].textContent;
console.log(result);
summary.innerText = result;
var DocLevels = xmlDoc.getElementsByTagName("DocumentLevel")[0];
Subjectivity.innerText =
DocLevels.getElementsByTagName("Subjectivity")[0].textContent;
tone.innerText =
DocLevels.getElementsByTagName("Tone")[0].textContent;
console.log('Subjectivity' + Subjectivity);
console.log('Tone' + tone);
return result;
})
```

To instruct browser application 300 to display the result, summarizer 301 can include a manifest file (e.g., "popup.js") that specifies, among others, version information and permission, as illustrated below:

```
{
    "name": "Magellan",
    "version": "1.0",
    "manifest_version": 2,
    "description": "Summarize pages for a popup",
    "browser_action": {
        "default_icon": "icon.png",
        "default_popup": "popup.html"
    },
    "permissions": ["tabs", "<all_urls>"]
}
```

The URL in popup.js should point to the instance of the text mining service (e.g., a web service provided by NLP text mining engine 235) utilized by summarizer 301. FIG. 3B shows an example of popup 340 displaying summarization range 355, sentiment 352, and summary 350. In this example, summarization range 355 is set by the user to two sentences. In some embodiments, summarization range 355 is configurable by the user. An example of summarization range 355 set to eight sentences is shown in FIG. 3C. In some embodiments, summarization range 355 is automated and not configurable by the user. In such cases, summarization range 355 may not be displayed within popup 340.

Embodiments of a summarizer described herein can leverage the power, speed, and intelligence of an AI platform for efficiently and automatically summarizing the main points of an article down to, for instance, one or two sentences and does so in real time (or near real time with only operational delay) in context of the article that a user is reading, without user intervention or forcing the user to leave the page on which the article is displayed. As explained above, the summarizer can take out all the cookies and non-relevant information displayed on the page so that the summarization can be done very efficiently. Further, because the summarizer is also configured for leveraging the sentiment analysis capability of the AI platform, the summary thus generated is significantly more relevant to the main article of the page. Moreover, because the summarizer can be implemented as an extension of a browser application, the summary returned by the AI platform can be displayed right next to or otherwise in close proximity to the article within the same web page where the article is displayed. This allows the user to view the article and the summary at the same time.

As described above, the summarizer is operable to examine the content a user is viewing on a user device, parse the textual information to get the relevant main body of the content, prepare a text block, get a summary and a sentiment of the text block from an AI platform, and instruct an application to display the summary and the sentiment all within the same page, in real time in context of the article or piece of content that the user is viewing. In some embodiments, the summary can be implemented as a tool that runs on a user device (e.g., a mobile device, a smart phone, a tablet computer, a portable computing device, a personal computer, etc.) and that can be called by another application to perform these functions. For example, an application can display a document with a .doc or .pdf extension and a user interface element (or menu item) for a summarizer. Once started, the summarizer can examine what a user is viewing through the application, parse the textual information, prepare a text block, get a summary and a sentiment of the text block from an AI platform, and instruct the application to display the summary and the sentiment all within the same page (or provide the results to the application to do so), in real time in context of the document that the user is viewing.

Another implementation may entail implementing a summarizer as a tool that can be triggered by a command on a mobile device. For instance, suppose a user is viewing a document on a mobile device and wishes to summarize the document, a command (e.g., a device operating system (OS) command) can invoke the summarizer. Once started, the summarizer can examine what is currently displayed on the mobile device, parse the textual information, prepare a text block, get a summary and a sentiment of the text block from an AI platform, and generate a new page on a mobile phone to display the summary and the sentiment, in real time in response to the command.

As described above, many features of the AI platform can be accessible by the summarizer. For instance, adding a command for categorization may return a category for the document. Likewise, the summarizer can also obtain named entities, concepts, etc. from the document (in addition or instead of the sentiment) for an AI-augmented analysis of the document that the user is viewing.

Figure 4:
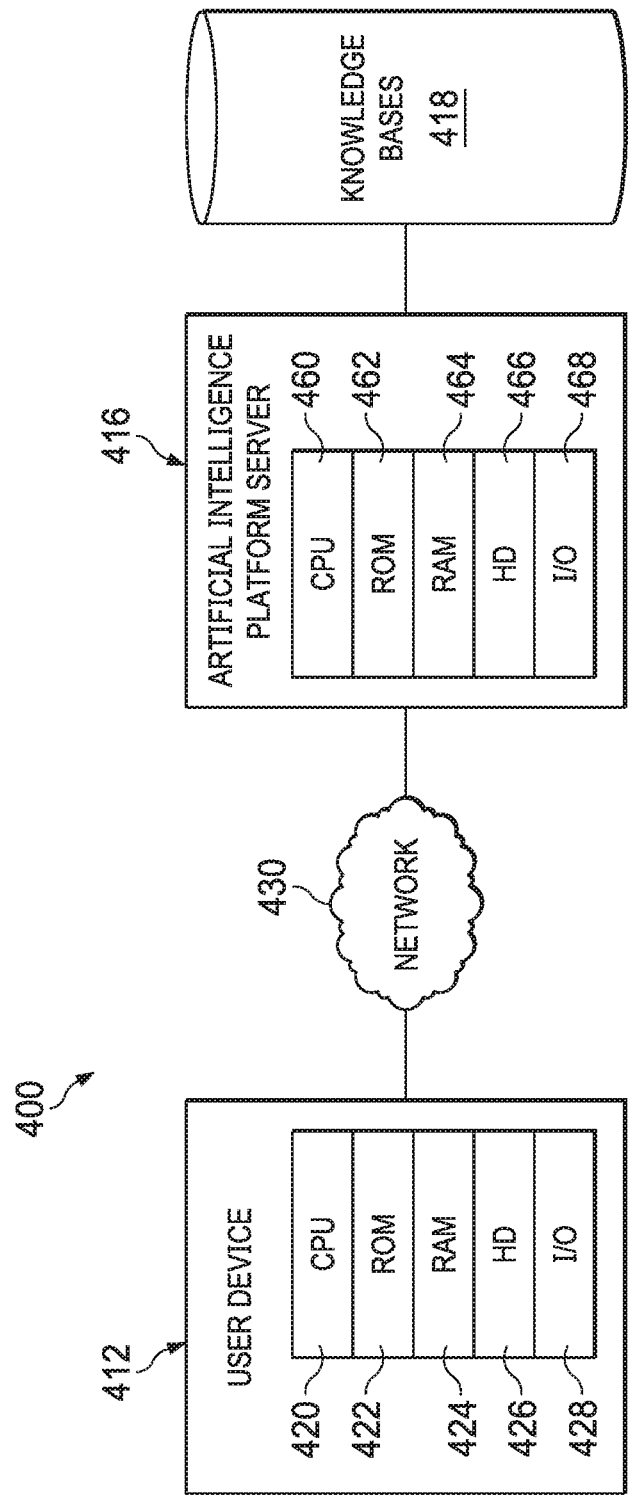
FIG. 4 depicts a diagrammatic representation of a distributed network computing environment where embodiments disclosed can be implemented.

FIG. 4 depicts a diagrammatic representation of a distributed network computing environment where embodiments disclosed can be implemented. In the example of FIG. 4, network computing environment 400 may include network 430 that can be bi-directionally coupled to user computer 412 and AI platform server 416 which, in this example, has access to knowledge bases 418. Network 430 may represent a combination of wired and wireless networks that network computing environment 400 may utilize for various types of network communications known to those skilled in the art.

For the purpose of illustration, a single system is shown for each of user computer 412 and AI platform server 416. However, within each of user computer 412 and AI platform server 416, a plurality of computers (not shown) may be interconnected to each other over network 430. For example, a plurality of user computers may be communicatively connected over network 430 to one or more AI platform servers.

User computers 412 may include a data processing system for communicating with AI platform server 416. User computer 412 can include central processing unit ("CPU") 420, read-only memory ("ROM") 422, random access memory ("RAM") 424, hard drive ("HD") or storage memory 426, and input/output device(s) ("I/O") 428. I/O 428 can include a keyboard, monitor, printer, electronic pointing device (e.g., mouse, trackball, stylus, etc.), or the like. User computer 412 can include a desktop computer, a laptop computer, a personal digital assistant, a cellular phone, or nearly any device capable of communicating over a network. AI platform server 416 may include CPU 460, ROM 462, RAM 464, HD 466, and I/O 468. Many other alternative configurations are possible and known to skilled artisans.

Each of the computers in FIG. 4 may have more than one CPU, ROM, RAM, HD, I/O, or other hardware components. For the sake of brevity, each computer is illustrated as having one of each of the hardware components, even if more than one is used. Each of computers 412 and 416 is an example of a data processing system. ROM 422 and 462; RAM 424 and 464; HD 426 and 466; and data store 418 can include media that can be read by CPU 420 and/or 460. Therefore, these types of memories include non-transitory computer-readable storage media. These memories may be internal or external to computers 412 or 416.

Portions of the methods described herein may be implemented in suitable software code that may reside within ROM 422 or 462; RAM 424 or 464; or HD 426 or 466. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   receiving, by a summarizer on a user device, an instruction from a user to summarize content displayed on the user device;
   responsive to the instruction from the user, examining, by the summarizer, the content displayed on the user device;
   determining, by the summarizer based on the examining, a main body of the content;
   extracting, by the summarizer, texts from the main body of the content;
   concatenating, by the summarizer, the texts from the main body of the content into a text block;
   making, by the summarizer, a call to an artificial intelligence (AI) platform, the AI platform having a summarization component and a sentiment analyzer component, the call containing the text block and specifying:
   a summarization range for summarizing the text block,
   the summarization component of the AI platform for generating a summary of the text block in the summarization range, and
   the sentiment analyzer component of the AI platform for generating a sentiment of the text block, wherein the AI platform returns, to the summarizer on the user device, the sentiment and the summary in the summarization range; and
   instructing, by the summarizer, an application on the user device to display the sentiment and the summary in the summarization range on the user device.

2. The method according to claim 1, wherein the application comprises a browser application, wherein the instruction is received from the user through the browser application, wherein the content comprises a web page, wherein the main body comprises an article within the web page, and wherein the sentiment and the summary in the summarization range are displayed in a popup on the user device in real time in context of the article within the web page.

3. The method according to claim 2, wherein the summarizer runs in an environment provided by the browser application on the user device.

4. The method according to claim 2, wherein the summarizer is implemented as an extension of the browser application on the user device.

5. The method according to claim 2, wherein examining the content further comprises examining a source code of the web page and identifying text nodes in the source code corresponding to the main body, and wherein extracting texts from the content further comprises parsing the text nodes and extracting the texts from the text nodes.

6. The method according to claim 5, wherein identifying text nodes in the source code further comprises identifying HyperText Markup Language (HTML) tags, the HTML tags including at least a <p> tag, a <plaintext> tag, or a <div> tag.

7. The method according to claim 1, wherein the user device comprises a mobile device, a smart phone, a laptop computer, or a desktop computer.

8. The method according to claim 1, wherein the summarizer operates on the user device as an agent of the AI platform and independently of the application.

9. The method according to claim 1, wherein the content comprises a document having a portal document format (PDF) extension or a doc extension.

10. The method according to claim 1, wherein the summarization range comprises a number, category, percentage, or size of sentence.

11. The method according to claim 1, further comprising:
    storing the sentiment or the summary on the user device; or
    forwarding the sentiment or the summary to another device over a network.

12. A system, comprising:
    a processor;
    a non-transitory computer-readable medium; and
    stored instructions translatable by the processor to perform:
    receiving an instruction from a user to summarize content displayed on a user device;
    responsive to the instruction from the user, examining the content displayed on the user device;
    determining, based on the examining, a main body of the content;
    extracting texts from the main body of the content;
    concatenating the texts from the main body of the content into a text block;
    making a call to an artificial intelligence (AI) platform, the AI platform having a summarization component and a sentiment analyzer component, the call containing the text block and specifying:
    a summarization range for summarizing the text block,
    the summarization component of the AI platform for generating a summary of the text block in the summarization range, and
    the sentiment analyzer component of the AI platform for generating a sentiment of the text block, wherein the AI platform returns, to the summarizer on the user device, the sentiment and the summary in the summarization range; and
    instructing an application on the user device to display the sentiment and the summary in the summarization range on the user device.

13. The system of claim 12, wherein the application comprises a browser application, wherein the instruction is received from the user through the browser application, wherein the content comprises a web page, wherein the main body comprises an article within the web page, and wherein the sentiment and the summary in the summarization range are displayed in a popup on the user device in real time in context of the article within the web page.

14. The system of claim 13, wherein examining the content further comprises examining a source code of the web page and identifying text nodes in the source code corresponding to the main body, and wherein extracting texts from the content further comprises parsing the text nodes and extracting the texts from the text nodes.

15. The system of claim 14, wherein identifying text nodes in the source code further comprises identifying HyperText Markup Language (HTML) tags, the HTML tags including at least a <p> tag, a <plaintext> tag, or a <div> tag.

16. The system of claim 12, wherein the user device comprises a mobile device, a smart phone, a laptop computer, or a desktop computer.

17. The system of claim 12, wherein the content comprises a document having a portal document format (PDF) extension or a doc extension.

18. The system of claim 12, wherein the summarization range comprises a number, category, percentage, or size of sentence.

19. The system of claim 12, wherein the instructions are further translatable by the processor to perform:
   storing the sentiment or the summary on the user device.

20. The system of claim 12, wherein the instructions are further translatable by the processor to perform:
   forwarding the sentiment or the summary to another device over a network.

* * * * *

UNITED STATES PATENT AND TRADEMARK OFFICE
CERTIFICATE OF CORRECTION

| | |
|---|---|
| PATENT NO. | : 11,017,179 B2 |
| APPLICATION NO. | : 16/235031 |
| DATED | : May 25, 2021 |
| INVENTOR(S) | : Gareth Edward Hutchins |

It is certified that error appears in the above-identified patent and that said Letters Patent is hereby corrected as shown below:

In the Specification

At Column 1, Line 40, delete the word "and" after the word "then".

At Column 2, Line 45, delete the word "as" after the word "implemented".

At Column 4, Line 47, replace the word "examiner" with the word "examine".

Signed and Sealed this
Twelfth Day of December, 2023

Katherine Kelly Vidal
*Director of the United States Patent and Trademark Office*